(12) United States Patent
Goyal et al.

(10) Patent No.: US 9,253,688 B2
(45) Date of Patent: Feb. 2, 2016

(54) RESPONDING TO A PAGE MESSAGE

(71) Applicant: Apple Inc., Cupertino, CA (US)

(72) Inventors: Anish K. Goyal, Santa Clara, CA (US); Chandra S. Chetty, Sunnyvale, CA (US); Tahir Shamim, San Jose, CA (US); Jianxiong Shi, Pleasanton, CA (US); Wanping Zhang, San Jose, CA (US)

(73) Assignee: Apple Inc., Curpertino, CA (US)

( * ) Notice: Subject to any disclaimer, the term of this patent is extended or adjusted under 35 U.S.C. 154(b) by 0 days.

(21) Appl. No.: 14/482,775

(22) Filed: Sep. 10, 2014

(65) Prior Publication Data

US 2014/0376516 A1    Dec. 25, 2014

Related U.S. Application Data

(62) Division of application No. 13/929,489, filed on Jun. 27, 2013, now Pat. No. 8,867,517.

(60) Provisional application No. 61/665,856, filed on Jun. 28, 2012.

(51) Int. Cl.
| | |
|---|---|
| *H04W 36/00* | (2009.01) |
| *H04W 72/04* | (2009.01) |
| *H04W 76/02* | (2009.01) |
| *H04W 72/00* | (2009.01) |
| *H04W 68/02* | (2009.01) |
| H04W 68/00 | (2009.01) |
| H04W 88/06 | (2009.01) |
| H04W 36/14 | (2009.01) |

(52) U.S. Cl.
CPC ........ *H04W 36/0022* (2013.01); *H04W 68/005* (2013.01); *H04W 68/02* (2013.01); *H04W 72/00* (2013.01); *H04W 72/04* (2013.01); *H04W 72/0446* (2013.01); *H04W 76/02* (2013.01); *H04W 36/14* (2013.01); *H04W 68/00* (2013.01); *H04W 76/026* (2013.01); *H04W 88/06* (2013.01)

(58) Field of Classification Search
CPC ..... H04W 72/00; H04W 72/04; H04W 76/02; H04W 72/02
See application file for complete search history.

(56) References Cited

U.S. PATENT DOCUMENTS

| | | | |
|---|---|---|---|
| 2010/0003988 A1* | 1/2010 | Buckley et al. | 455/436 |
| 2012/0184266 A1* | 7/2012 | Faccin et al. | 455/426.1 |
| 2012/0270545 A1* | 10/2012 | Zhao et al. | 455/435.1 |

* cited by examiner

*Primary Examiner* — Raj Jain
(74) *Attorney, Agent, or Firm* — Downey Brand LLP (57) ABSTRACT

A method for responding to a page message is provided. The method can include a wireless communication device receiving a page message on a first channel of a first network; suspending a connection to a second network in response to receiving the page message; transitioning to a second channel of the first network prior to responding to the page message; and sending a response message responsive to the page message on the second channel.

20 Claims, 7 Drawing Sheets

RESPONDING TO A PAGE MESSAGE

CROSS-REFERENCE TO RELATED APPLICATIONS

This application is a divisional of U.S. application Ser. No. 13/929,489, filed Jun. 27, 2013 and entitled "RESPONDING TO A PAGE MESSAGE", which claims the benefit of U.S. Provisional Application No. 61/665,856, filed Jun. 28, 2012 and entitled "OPTIMIZATIONS FOR 1X PAGE RESPONSE IN SINGLE RADIO LTE MODE OF OPERATION", both of which are incorporated by reference herein in their entirety.

FIELD

The described embodiments relate generally to wireless communications technology, and more particularly to responding to a page message.

BACKGROUND

Efforts are ongoing to develop and deploy new and improved cellular radio access technologies (RATs). For example, networks implementing Long Term Evolution (LTE) technology, developed and standardized by the Third Generation Partnership Project (3GPP), are currently being deployed. LTE and other newer RATs often support faster data rates than networks utilizing legacy RATs, such as various second generation (2G) and third generation (3G) RATs.

However, in some deployments, LTE and other new RATs may not fully support some services that can be handled by legacy networks. Accordingly, LTE networks are often co-deployed in overlapping regions with legacy networks and wireless communication devices may transition between RATs as services or coverage may require. For example, in some deployments, LTE networks are not capable of supporting voice calls. Thus, for example when a wireless communication device receives or initiates a circuit switched voice call while connected to an LTE network that supports data sessions, but not voice calls, the wireless communication device can transition to a legacy network, such as Code Division Multiple Access 2000 (CDMA2000) 1X, which is standardized by the Third Generation Partnership Project 2 (3GPP2), that supports voice calls.

Some wireless communication devices use a single radio to support operation on multiple cellular RATs. For example, some wireless communication devices use a single radio to support operation on both LTE and CDMA2000 1X networks. The use of a single radio for multiple RATs makes transitioning between networks, such as in response to a page message for an incoming voice call or circuit switched service, more complex.

SUMMARY

Some embodiments disclosed herein provide improvements for responding to a page message. More particularly, some example embodiments provide a wireless communication device that can respond to a page message on a different channel than a channel on which the page message is received. Such example embodiments can be particularly beneficial for wireless communication devices using a single radio to support operation on multiple RATs, such as single radio LTE (SRLTE) devices, which can use a single radio to support operation on both LTE and CDMA2000 1X networks. In this regard, if a single radio wireless communication device in accordance with some example embodiments has an active connection to a first network, such as an LTE network, and receives a page message on a first channel of a second network, such as a CDMA2000 1X network, the device can transition to a second channel of the second network prior to responding to the page message. Such example embodiments can accordingly enable a wireless communication device to transition to a channel having a better signal quality prior to responding to the page message. A voice call and/or other service for which the page message is received can accordingly be serviced on a better channel of the second network, thus reducing the risk of call drops, reducing the incidence of network signaling overhead from performance of a handover to a better channel shortly after responding to the page message, and improving user experience.

In a first embodiment, a method for responding to a page message is provided. The method of the first embodiment can include a wireless communication device receiving a General Page Message (GPM) on a first channel of a Code Division Multiple Access 2000 (CDMA2000) 1X network. The method of the first embodiment can further include the wireless communication device suspending a connection to a second network in response to receiving the GPM. The second network can implement a Long Term Evolution (LTE) radio access technology (RAT). The method of the first embodiment can additionally include the wireless communication device transitioning to a second channel of the CDMA2000 1X network prior to responding to the GPM; and sending a Page Response Message (PRM) responsive to the GPM on the second channel.

In a second embodiment, a wireless communication device is provided. The wireless communication device of the second embodiment can include a radio and processing circuitry coupled to the radio. The radio can be configured to support communication with a first network and with a second network. The processing circuitry can be configured to control the wireless communication device of the second embodiment to at least receive a page message on a first channel of the first network; suspend a connection to the second network in response to receiving the page message; transition to a second channel of the first network prior to responding to the page message; and send a response message responsive to the page message on the second channel.

In a third embodiment, a computer program product is provided. The computer program product of the third embodiment can include at least one non-transitory computer readable storage medium having program code stored thereon. The program code of the third embodiment can include program code for receiving a page message on a first channel of a first network; program code for suspending a connection to a second network in response to receiving the page message; program code for transitioning to a second channel of the first network prior to responding to the page message; and program code for sending a response message responsive to the page message on the second channel.

In a fourth embodiment, an apparatus is provided. The apparatus of the fourth embodiment can include means for receiving a page message on a first channel of a first network; means for suspending a connection to a second network in response to receiving the page message; means for transitioning to a second channel of the first network prior to responding to the page message; and means for sending a response message responsive to the page message on the second channel.

This Summary is provided merely for purposes of summarizing some example embodiments so as to provide a basic understanding of some aspects of the disclosure. Accordingly, it will be appreciated that the above described example embodiments are merely examples and should not be construed to narrow the scope or spirit of the disclosure in any way. Other embodiments, aspects, and advantages will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings are not necessarily drawn to scale, and in no way limit any changes in form and detail that may be made to the described embodiments by one skilled in the art without departing from the spirit and scope of the described embodiments.

DETAILED DESCRIPTION

In a CDMA 2000 1X network, (as described in 3GPP2 CDMA specifications), when a wireless communication device receives a general page message (GPM), the page response message (PRM) is generally sent on the same channel on which the GPM is received to the sending base station. The only scenario in which prior wireless communication devices can send a PRM on a channel other than the channel on which the GPM is received is if the device can perform an access entry handoff (AEHO) procedure prior to sending the PRM. However, the network controls whether the device is allowed to perform an AEHO, and in many instances, the device may not be allowed by the network to perform an AEHO. Thus, prior devices are typically not allowed to perform a handoff to a another channel (e.g., a better pilot channel) while processing a GPM, even if there is another channel that has a better signal quality, which can indicate better network performance. If a prior device does perform a handoff to another channel prior to responding to a page message, the device does not send a response to the page message, and a call failure can result.

One possible work around to reduce call failure is to reduce the amount of time that the CDMA 2000 1X stack waits for LTE suspend to complete to reduce the possibility of a handoff occurring before the response to a page message. Another option is to drop any handoff triggers from lower layers while CDMA 2000 1X is waiting for the LTE suspend to complete to prevent an idle mode handoff before responding to the page message.

However, for a wireless communication device using a single radio to support communication with multiple RATs, such as an SRLTE device, which can use a single radio to support both LTE and CDMA 2000 1X connections, it can be beneficial for a device to perform an idle handoff to a different (e.g., better) channel of a network (e.g., a CDMA 2000 1X network) after decoding a received page message and before sending a page response. For example, it can be beneficial to perform a handoff while 1X is waiting for suspension of an LTE connection to be completed. Additionally or alternatively, it can be beneficial to perform a handoff through channel hashing to another channel before sending the page response. As discussed above, in prior systems, such handoffs before sending the page response would be prohibited, or if a handoff did occur, a prior device would not be allowed to send a page response on the new channel and a call failure would result. Some example embodiments described further herein below provide for responding to a page message on a channel other than the channel on which the page message was received, thus allowing a device to transition to a better channel before responding to a page message without resulting in a call failure even in instances in which a network has not enabled the device to perform an AEHO procedure. A voice call and/or other service for which the page message is received can accordingly be serviced on a better channel of the second network, thus reducing the risk of call drops, reducing the incidence of network signaling overhead from performance of a handover to a better channel shortly after responding to the page message, and improving user experience.

Figure 1:
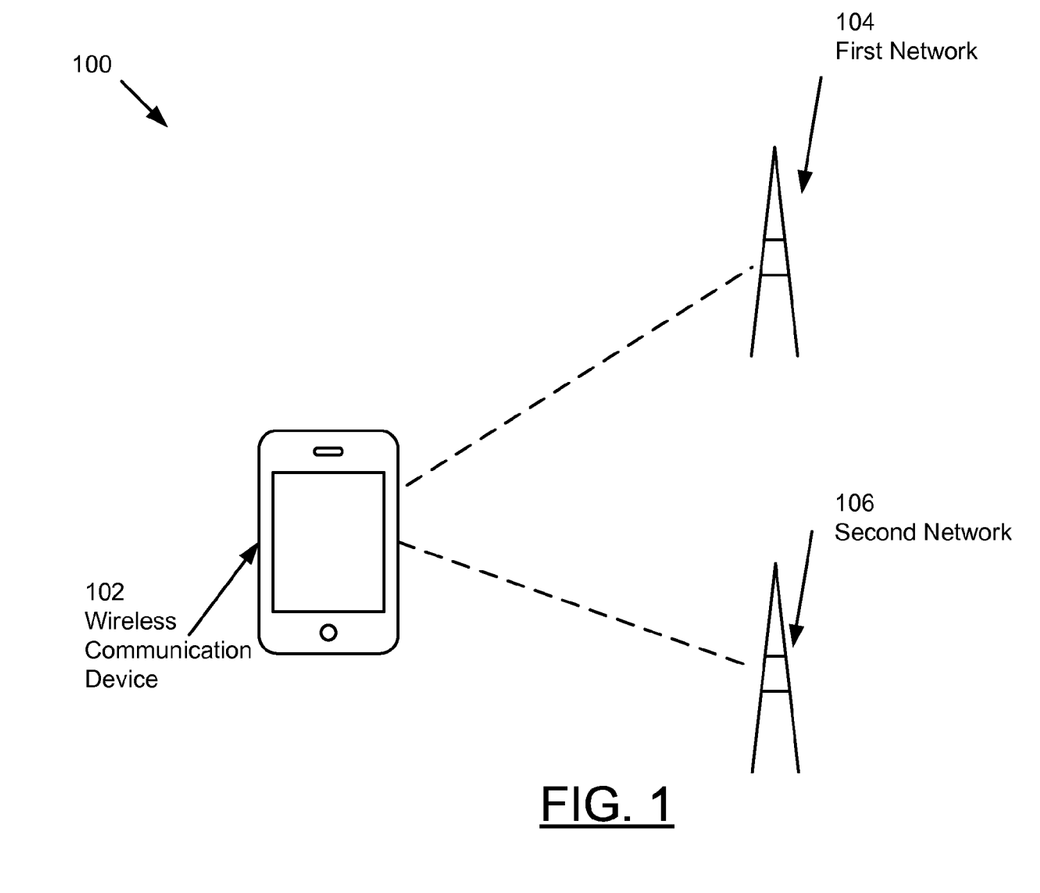
FIG. 1 illustrates a wireless communication system in accordance with some example embodiments.

FIG. 1 illustrates a wireless communication system 100 in accordance with some example embodiments. The system 100 can include a wireless communication device 102. By way of non-limiting example, the wireless communication device 102 can be a cellular phone, such as a smart phone device, a tablet computing device, a laptop computing device, or other computing device configured to support communication via one or more RATs, such as one or more cellular RATs. In some embodiments, such as some embodiments in which the wireless communication device 102 is configured to support communication via a network implementing an LTE RAT, such as an LTE network, an LTE-Advanced (LTE-A), and/or other present or future developed LTE RAT, the wireless communication device 102 can be referred to as user equipment (UE).

The wireless communication device 102 can be in an area of overlapping deployment of a first network 104 and a second network 106. The first network 104 and second network 106 can each implement any respective RAT. However, a RAT implemented by the first network 104 can be different than a RAT implemented by the second network 106.

In some example embodiments, the first network 104 can be a legacy network having a CS domain configured to support CS services, such as CS voice calls. By way of non-limiting example, the first network 104 can be a third generation (3G) network, such as a CDMA2000 1X network; a Universal Mobile Telecommunications System (UMTS), such as a Time Division Synchronous Code Division Multiple Access (TD-SCDMA) network or Wideband Code Division Multiple Access (WCDMA) network; or other 3G network. As a further example, the first network 104 can be a second Generation (2G) network, such as a Global System for Mobile Communications (GSM) network.

In some example embodiments, the second network 106 can implement a RAT including a packet switched (PS) domain for supporting PS data sessions, but which does not include a circuit switched (CS) domain for supporting CS services, such as CS voice calls. Thus, for example, the second network 106 of some example embodiments, can implement an LTE RAT (e.g., LTE, LTE-A, and/or other present or future developed LTE RAT), and/or other fourth generation (4G) RAT an LTE or other 4G network, that does not include a CS domain.

In some example embodiments, the wireless communication device 102 can use a single radio to support communication with both the first network 104 and the second network 106. For example, in some embodiments in which the second network 106 implements an LTE RAT, the wireless communication device 102 can be an SRLTE device.

Wireless communication device 102 can have an active connection to the second network 106 and can receive a page message on a first channel of the first network 104. The page message can, for example, be a page for a mobile terminated (MT) voice call and/or other CS service. For example, in embodiments in which the first network 104 is a CDMA2000 1X network, the page message can be a General Page Message (GPM). In response to receiving the page message, the wireless communication device 102 can suspend its connection to the second network 106 so that the wireless communication device 102 can respond to the page message on the first network 104 and accept the MT voice call and/or other service for which the wireless communication device 102 is being paged. As described further herein below, the wireless communication device 102 of some example embodiments can transition to a second channel of the first network 104 prior to responding to the page message and can send a response message, such as a page response message (PRM), in response to the page message on the second channel of the first network 104 rather than the first channel of the first network 104.

Figure 2:
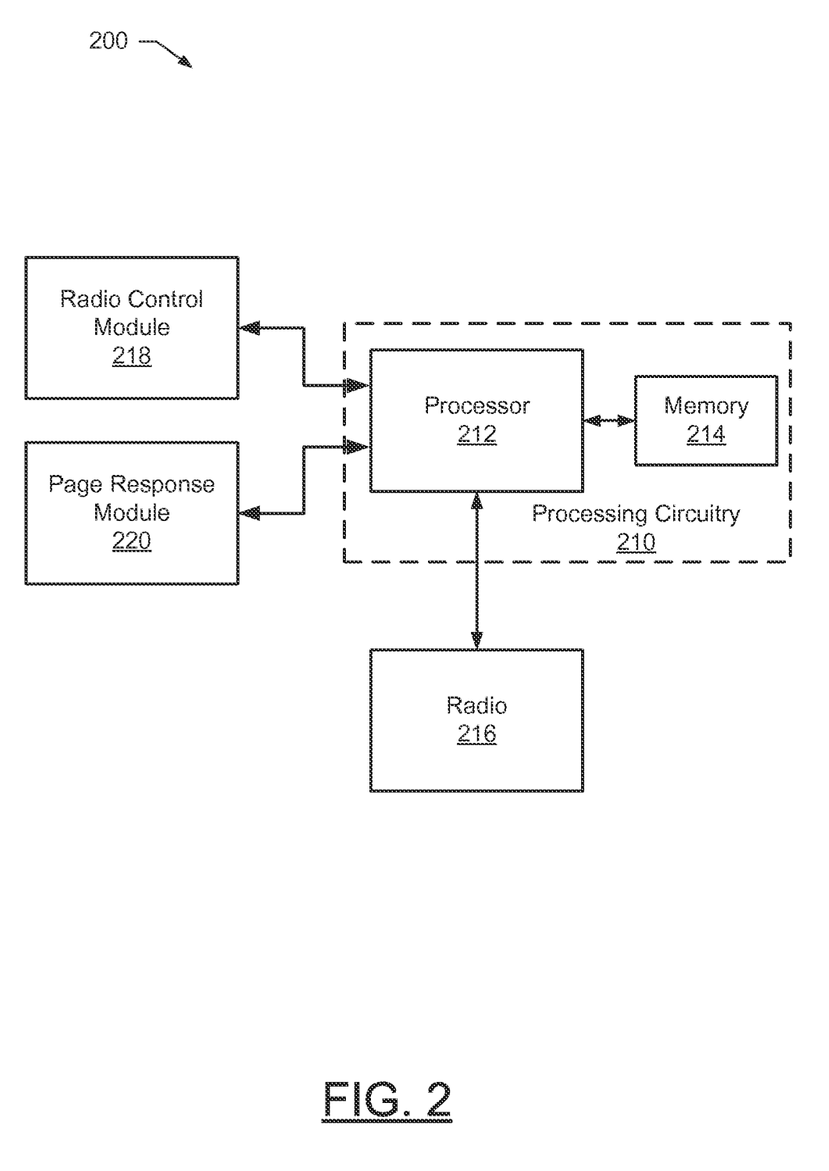
FIG. 2 illustrates a block diagram of an apparatus that can be implemented on a wireless communication device in accordance with some example embodiments.

FIG. 2 illustrates a block diagram of an apparatus 200 that can be implemented on a wireless communication device 102 in accordance with some example embodiments. In this regard, when implemented on a computing device, such as wireless communication device 102, apparatus 200 can enable the computing device to operate within the system 100 in accordance with one or more example embodiments. It will be appreciated that the components, devices or elements illustrated in and described with respect to FIG. 2 below may not be mandatory and thus some may be omitted in certain embodiments. Additionally, some embodiments can include further or different components, devices or elements beyond those illustrated in and described with respect to FIG. 2.

In some example embodiments, the apparatus 200 can include processing circuitry 210 that is configurable to perform actions in accordance with one or more example embodiments disclosed herein. In this regard, the processing circuitry 210 can be configured to perform and/or control performance of one or more functionalities of the apparatus 200 in accordance with various example embodiments, and thus can provide means for performing functionalities of the apparatus 200 in accordance with various example embodiments. The processing circuitry 210 can be configured to perform data processing, application execution and/or other processing and management services according to one or more example embodiments.

In some embodiments, the apparatus 200 or a portion(s) or component(s) thereof, such as the processing circuitry 210, can include one or more chipsets, which can each include one or more chips. The processing circuitry 210 and/or one or more further components of the apparatus 200 can therefore, in some instances, be configured to implement an embodiment on a single chip or chipset. In some example embodiments in which one or more components of the apparatus 200 are embodied as a chipset, the chipset can be capable of enabling a computing device to operate in the system 100 when implemented on or otherwise operably coupled to the computing device. Thus, for example, one or more components of the apparatus 200 can provide a chipset configured to enable a computing device to operate over the first network 104 and/or the second network 106. In accordance with some example embodiments, one or more components of the apparatus 200 can provide a cellular baseband chipset.

In some example embodiments, the processing circuitry 210 can include a processor 212 and, in some embodiments, such as that illustrated in FIG. 2, can further include memory 214. The processing circuitry 210 can be in communication with or otherwise control a radio 216, radio control module 218, and/or page response module 220.

The processor 212 can be embodied in a variety of forms. For example, the processor 212 can be embodied as various hardware-based processing means such as a microprocessor, a coprocessor, a controller or various other computing or processing devices including integrated circuits such as, for example, an ASIC (application specific integrated circuit), an FPGA (field programmable gate array), some combination thereof, or the like. Although illustrated as a single processor, it will be appreciated that the processor 212 can comprise a plurality of processors. The plurality of processors can be in operative communication with each other and can be collectively configured to perform one or more functionalities of the apparatus 200 as described herein. In some example embodiments, the processor 212 can be configured to execute instructions that can be stored in the memory 214 or that can be otherwise accessible to the processor 212. As such, whether configured by hardware or by a combination of hardware and software, the processor 212 capable of performing operations according to various embodiments while configured accordingly.

In some example embodiments, the memory 214 can include one or more memory devices. Memory 214 can include fixed and/or removable memory devices. In some embodiments, the memory 214 can provide a non-transitory computer-readable storage medium that can store computer program instructions that can be executed by the processor 212. In this regard, the memory 214 can be configured to store information, data, applications, instructions and/or the like for enabling the apparatus 200 to carry out various functions in accordance with one or more example embodiments. In some embodiments, the memory 214 can be in communication with one or more of the processor 212, radio 216, radio control module 218, or page response module via a bus(or buses) for passing information among components of the apparatus 200.

The apparatus 200 can further include a radio 216. The radio 216 can be configured to enable the apparatus 200 to send wireless signals to and receive signals from both the first network 104 and the second network 106. In this regard, the apparatus 200 of some example embodiments can use a single radio to support communication via both a RAT implemented by the first network 104 and a RAT implemented by the second network 106. As such, the radio 216 can be configured to support any type of cellular or other wireless communication technology that may be implemented by the first network 104 and/or second network 106.

The apparatus 200 can further include radio control module 218. The radio control module 218 can be embodied as various means, such as circuitry, hardware, a computer program product comprising a computer readable medium (for example, the memory 214) storing computer readable program instructions that are executable by a processing device (for example, the processor 212), or some combination thereof. In some embodiments, the processor 212 (or the processing circuitry 210) can include, or otherwise control the radio control module 218. The radio control module 218 can be configured to control operation of the radio 216. For example, in some example embodiments, the radio control module 218 can be configured to tune the radio 216 (e.g., to perform a tune away) to/from a network, such as the first network 104 and second network 106. As a further example, in some example embodiments, the radio control module 218 can be configured to control the radio 216 to transition between channels of a network, such as between channels of the first network 104. As a more particular example, the radio control module 218 can be configured to cause the wireless communication device 102 to perform an idle mode handoff to another channel, such as based on a measured channel quality metric indicating that the target channel is better than a current channel. The radio control module 218 can additionally or alternatively be configured to control the wireless communication device 102 to perform channel hashing to another channel.

The apparatus 200 can further include page response module 220. The page response module 220 can be embodied as various means, such as circuitry, hardware, a computer program product comprising a computer readable medium (for example, the memory 214) storing computer readable program instructions that are executable by a processing device (for example, the processor 212), or some combination thereof. In some embodiments, the processor 212 (or the processing circuitry 210) can include, or otherwise control the page response module 220. The page response module 220 can be configured to decode and/or otherwise process a received page message. The page response module 220 can be further configured to format and send a response message in response to a received page message.

Figure 3:
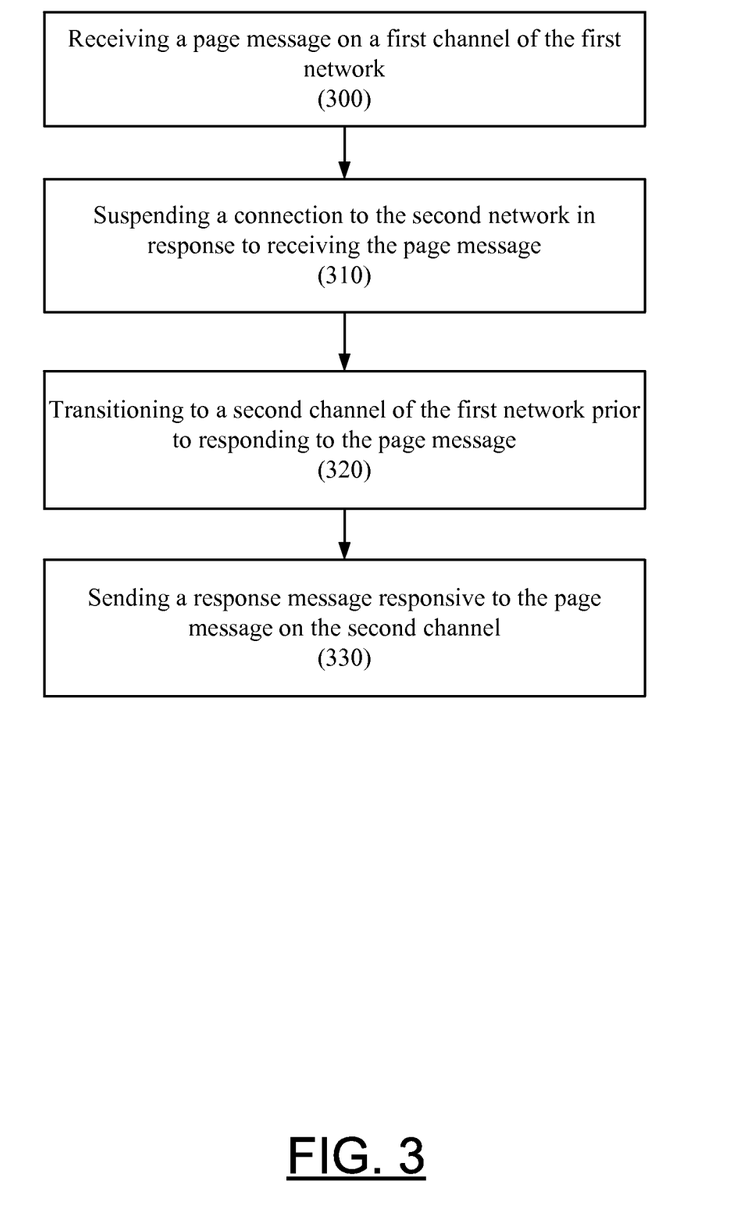
FIG. 3 illustrates a flowchart according to an example method for responding to a page message according to some example embodiments.

FIG. 3 illustrates a flowchart according to an example method for responding to a page message according to some example embodiments. In this regard, FIG. 3 illustrates operations that can be performed by a wireless communication device 102 in accordance with some example embodiments. One or more of processing circuitry 210, processor 212, memory 214, radio 216, radio control module 218, or page response module 220 can, for example, provide means for performing one or more of the operations illustrated in and described with respect to FIG. 3.

Operation 300 can include the wireless communication device 102 receiving a page message on a first channel of the first network 104. In embodiments in which the first network 104 is a CDMA2000 1X network, the page message can be a GPM. The page message can, for example, be a page message for an MT voice call and/or for another CS service, which can be serviced by the first network 104. The received page message can be decoded by the page response module 220.

In response to receipt of the page message, the wireless communication device 102 can suspend a connection to the second network 106, at operation 310. In some example embodiments suspension of the connection to the second network 106 can include the radio control module 218 sending a message to the second network 106, which is configured to trigger suspension of the connection to the second network 106. For example, in some embodiments in which the second network 106 implements an LTE RAT, operation 310 can include sending an Extended Service Request (ESR) to the second network 106. In some embodiments in which a message is sent to the second network 106 to trigger suspension of the connection, operation 310 can include the radio control module 218 tuning the radio 216 away from the first network 104 to the second network 106, sending the message, and then tuning the radio 216 back to the first network 104. An example method for suspending the connection to the second network 106 in accordance with some such embodiments in which a message configured to trigger suspension of the connection is sent to the second network 106 is illustrated in and described in more detail with respect to FIG. 4 below. Additionally or alternatively, in some embodiments, the wireless communication device 102 can suspend a connection to the second network 106 internally without sending a message or other notification to the second network 106.

Operation 320 can include the wireless communication device 102 transitioning to a second channel of the first network 104 prior to responding to the page message. Operation 320 can, for example, be performed at least partially under the control of the radio control module 218, which can, in some example embodiments, control the radio 216 to transition to the second channel. The second channel can, for example, be a channel (e.g., a pilot channel) having a better signal quality than the first channel. In some example embodiments, the transition to the second channel can occur while waiting for the suspension of the connection to the second network 106 to be completed. In some example embodiments in which performance of operation 310 includes tuning the radio 216 away from the first network 104 to the second network 106 and sending a message configured to trigger suspension of the connection to the second network 106, such as illustrated in and further described with respect to FIG. 4 below, transitioning to the second channel of the first network 104 can be performed after the radio 216 is tuned back to the first network 104 and the connection to the first network 104 comes out of a sleep state. In embodiments in which the connection to the first network 104 is not put in a sleep state to facilitate performance of operation 310, transitioning to the second channel of the first network 104 can be performed at any time.

In some example embodiments, transitioning to the second channel can include the wireless communication device 102 performing one or more idle mode handoffs. Additionally or alternatively, in some example embodiments, transitioning to the second channel can include the wireless communication device 102 performing channel hashing to one or more channels. In this regard, the wireless communication device 102 can receive an overhead message, such as a channel list message, that can be sent by the first network 104, which can include a list of channels and the wireless communication device 102 can use hashing techniques based on an identifier, such as an International Mobile Subscriber Identity (IMSI), that can be unique to the wireless communication device 102 to perform hashing on the channel list and determine a channel(s) on which the wireless communication device 102 is permitted to camp. The wireless communication device 102 can accordingly perform channel hashing to a permitted channel. In some example embodiments, channel hashing can, for example, be performed in accordance with the 3GPP2 CDMA C.S0005 specification. In some instances, transitioning to the second channel can include a mix of one or more idle mode handoffs and channel hashing, such as illustrated in and described with respect to FIGS. 5 and 7 below.

As operation 320 can include the wireless communication device 102 performing one or more idle mode handoffs and/or performing channel hashing to one or more channels (e.g., one or more channel hashes), it will be appreciated that in some instances, transitioning to the second channel can include indirectly transitioning from the first channel to the second channel via one or more intermediate channels of the first network 104. As a non-limiting example of such an indirect transition, the wireless communication device 102 can perform an idle mode handoff from "Channel A" to "Channel B." The wireless communication device 102 can then receive and process a channel list message and determine that it is not permitted to camp on "Channel B." The wireless communication device 102 can then perform channel hashing to a permitted "Channel C" based on hashing the channel list message.

The transition to the second channel can, for example, include a transition to a second channel on the same base station/sector as the first channel. As another example, the transition to the second channel can be an inter-base station and/or inter-sector transition such that the second channel can be a channel on a different base station/sector than the base station/sector of the first channel. In some example embodiments, the channel of the first network 204 on which the page message is received (e.g., the first channel) and the second channel to which the wireless communication device 102 transitions in operation 320 can both be associated with a same System ID/network ID (SID/NID).

Operation 330 can include the page response module 220 sending a response message, such as a PRM, responsive to the page message on the second channel. As such, the response message can be sent on a channel of the first network 104 other than the channel on which the page message was received by the wireless communication device 102 in operation 300. However, the page message may have also been sent on the second channel by the first network 104 in some instances. In this regard, in some instances, the first network 104 may not know on which channel the wireless communication device 102 is camped at the time the page message is sent, and can send the page message on multiple channels. For example, in some embodiments, the first network 104 can send the page message on all channels/base stations in a SID/NID zone (e.g., channels/base stations associated with the same SID/NID).

Figure 4:
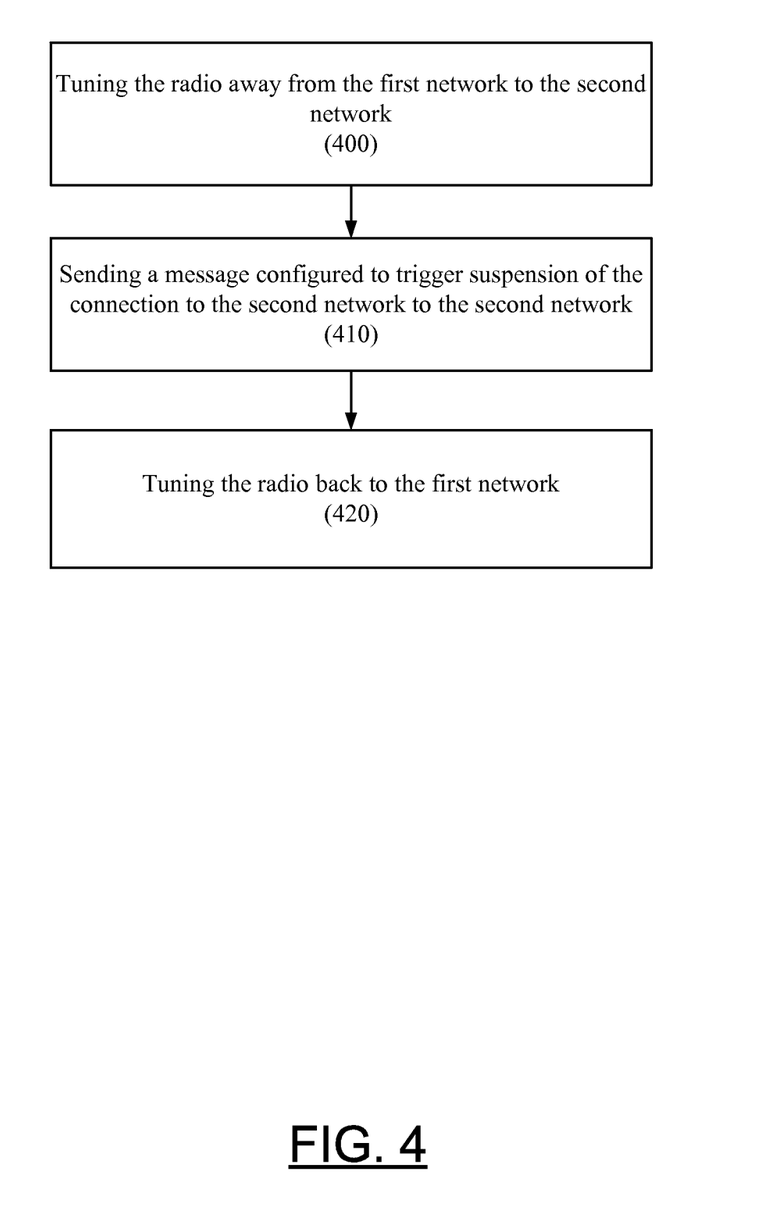
FIG. 4 illustrates a flowchart according to an example method for suspending a connection to a network in response to receipt of a page message according to some example embodiments.

FIG. 4 illustrates a flowchart according to an example method for suspending a connection to a network in response to receipt of a page message according to some example embodiments. In this regard, FIG. 4 illustrates operations that can be performed by the wireless communication device 102 attendant to performance of operation 310 in accordance with some example embodiments. One or more of processing circuitry 210, processor 212, memory 214, radio 216, radio control module 218, or page response module 220 can, for example, provide means for performing one or more of the operations illustrated in and described with respect to FIG. 4.

Operation 400 can include the radio control module 218 tuning the radio 216 away from the first network 104 to the second network 106. Operation 410 can include the wireless communication device 102 sending a message configured to trigger suspension of the connection to the second network 106. In some example embodiments, such as some embodiments in which the second network 106 implements an LTE RAT, the message can be an ESR. However, it will be appreciated that messages other than ESR messages are contemplated within the scope of the disclosure, and any message that can be used to trigger suspension of the connection can be sent in operation 410. Operation 420 can include the radio control module 218 tuning the radio 216 back to the first network 104 after sending the message.

Figure 5:
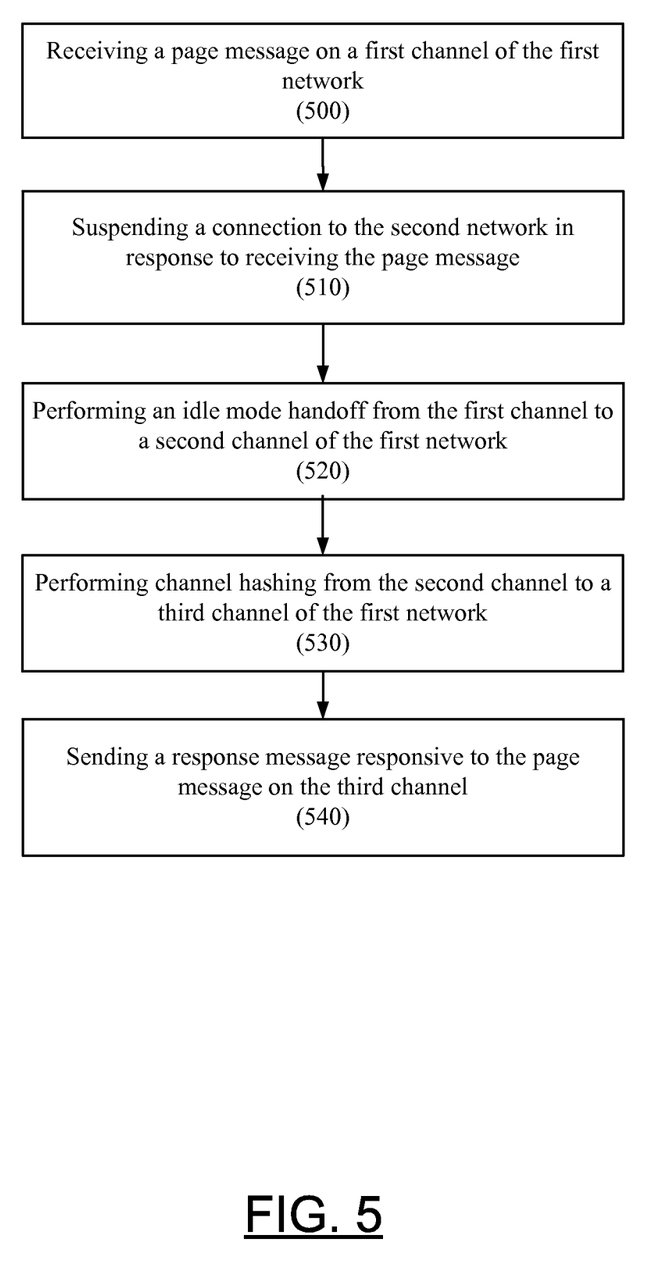
FIG. 5 illustrates a flowchart according to another example method for responding to a page message according to some example embodiments.

FIG. 5 illustrates a flowchart according to another example method for responding to a page message according to some example embodiments. In this regard, FIG. 5 illustrates operations that can be performed by wireless communication device 102 in accordance with an example embodiment of the method of FIG. 3 in which the device performs a combination of one or more idle mode handoffs and one or more channel hashes. One or more of processing circuitry 210, processor 212, memory 214, radio 216, radio control module 218, or page response module 220 can, for example, provide means for performing one or more of the operations illustrated in and described with respect to FIG. 5.

Operation 500 can include the wireless communication device 102 receiving a page message on a first channel of the first network 104. In this regard, operation 500 can correspond to an embodiment of operation 300.

Operation 510 can include the wireless communication device 102 suspending a connection to the second network 106 in response to receiving the page message. Operation 510 can accordingly correspond to an embodiment of operation 310.

Operation 520 can include the wireless communication device 102 performing an idle mode handoff from the first channel on which the page message is received in operation 500 to a second channel of the first network 104. The second channel can, for example, be a channel having a better signal quality than the first channel. Operation 520 can, for example, be performed at least partially under the control of the radio control module 218, which can, in some example embodiments, control the radio 216 to transition to the second channel.

Operation 530 can include the wireless communication device 102 performing channel hashing to transition from the second channel to a third channel of the first network 104. In this regard, the wireless communication device 102 can receive an overhead message, such as a channel list message, that can be sent by the first network 104, which can include a list of channels and the wireless communication device 102 can use hashing techniques based on an identifier, such as an International Mobile Subscriber Identity (IMSI), that can be unique to the wireless communication device 102 to perform hashing on the channel list and determine a channel(s) on which the wireless communication device 102 is permitted to camp. The wireless communication device 102 can accordingly perform channel hashing to a permitted channel (e.g., the third channel). For example, in some instances, the second channel to which the wireless communication device 102 can transition through performance of an idle mode handoff in operation 520 may not be a channel on which the wireless communication device 102 is permitted to camp, and the wireless communication device 102 can, in turn, perform a channel hash to a permitted channel after receiving and processing a channel list message.

Operations 520 and 530 can, for example, collectively comprise an embodiment of operation 320. It will be appreciated, however, that while a single idle mode handoff and a single channel hash are illustrated in and described by example with respect to FIG. 5, in some instances, the wireless communication device 102 can perform multiple idle mode handoffs and/or multiple channel hashes before responding to the page message. Further, while the performance of a channel hash is illustrated as occurring in operation 530 after performance of an idle mode handoff in operation 520, it will be appreciated that in some instances, the wireless communication device 102 can perform one or more channel hashes prior to performing an idle mode handoff and/or can perform one or more idle mode handoffs after performing a channel hash.

Operation 540 can include the page response module 220 sending a response message responsive to the page message on the third channel. In this regard, operation 540 can correspond to an embodiment of operation 330. The first network 104 can know the channels on which the wireless communication device 102 is permitted to camp through channel hashing and, as such, can be able to process a page response received on a channel other than that on which the page message is received by the wireless communication device 102 in accordance with some example embodiments.

Figure 6:
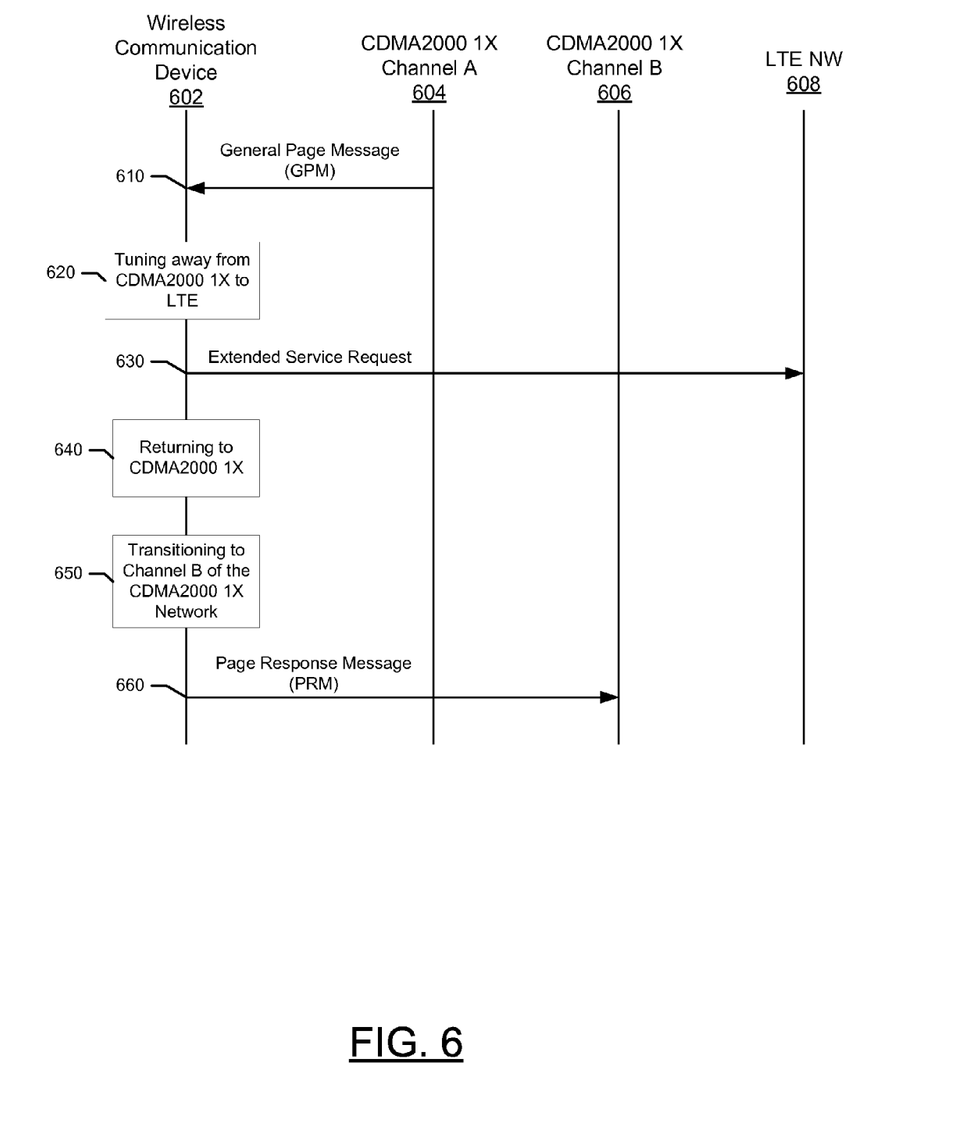
FIG. 6 illustrates a signaling diagram according to an example method for responding to a page message according to some example embodiments.

FIG. 6 illustrates a signaling diagram according to an example method for responding to a page message according to some example embodiments. In this regard, FIG. 6 illustrates example signaling that can be exchanged between a wireless communication device 602 and a Channel A 604 of a CDMA2000 1X network, a Channel B 606 of a CDMA2000 1X network, and an LTE network (NW) 608 in accordance with some example embodiments. The wireless communication device 602 in the example of FIG. 6 can, for example, be an embodiment of wireless communication device 102. The CDMA2000 1X network in the example of FIG. 6 can, for example, be an embodiment of the first network 104. The LTE network 608 in the example of FIG. 6 can, for example, be an embodiment of the second network 106.

In operation 610, the wireless communication device 602 can be camped on Channel A 604 and can receive a GPM sent by the CDMA2000 1X network on channel A 604. The wireless communication device 602 can have an active connection to the LTE network 608 and, in response to receiving the GPM, can tune its radio away from the CDMA2000 1X network to the LTE network 608. In this regard, the wireless communication device 602 can be an SRLTE device that can use a single radio to support both communication via the CDMA2000 1X network and the LTE network. Operation 630 can include the wireless communication device 602 sending an ESR to the LTE network 608 to trigger suspension of the connection to the LTE network 608. Operation 640 can include the wireless communication device 602 tuning the radio back to the CDMA2000 1X network and returning to the CDMA2000 1X network from the LTE network 608. In this regard, operations 620-640 can, for example, correspond to an embodiment of operations 400-420 as illustrated in and described with respect to FIG. 4.

Operation 650 can include the wireless communication device 602 transitioning to Channel B 606. Operation 650 can, for example, include the wireless communication device 602 performing one or more idle mode handoffs and/or one or more channel hashes, such as described with respect to operation 320. In some instances, the wireless communication device 602 can indirectly transition form Channel A 604 to Channel B 606 via one or more intermediate channels before settling on Channel B 606.

Operation 660 can include the wireless communication device 602 sending a PRM to Channel B 606. As such, the PRM can be sent on a channel other than the channel on which it was received by the wireless communication device 602.

Figure 7:
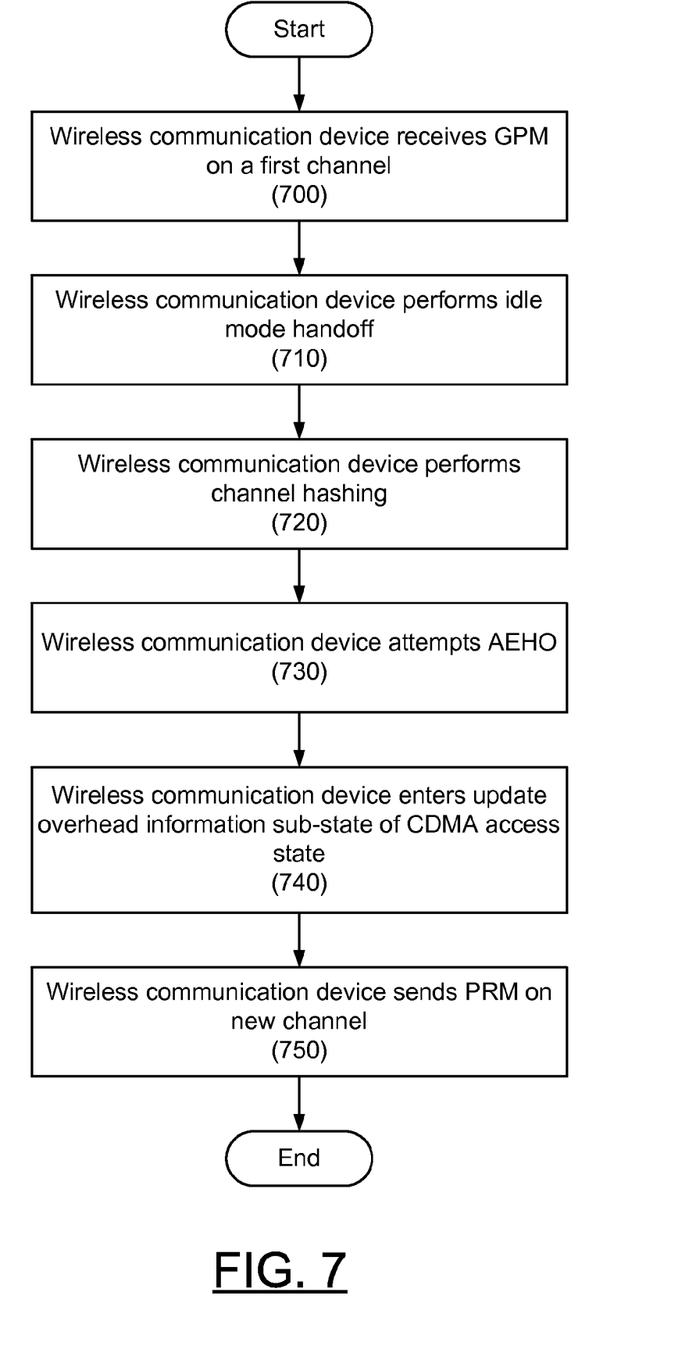
FIG. 7 illustrates a flowchart according to a further example method for responding to a page message according to some example embodiments.

FIG. 7 illustrates a flowchart according to a further example method for responding to a page message according to some example embodiments. In this regard, FIG. 7 illustrates operations that can be performed by a wireless communication device 102 in accordance with some example embodiments. One or more of processing circuitry 210, processor 212, memory 214, radio 216, radio control module 218, or page response module 220 can, for example, provide means for performing one or more of the operations illustrated in and described with respect to FIG. 7.

Operation 700 can include the wireless communication device 102 receiving a GPM on a first channel of the first network 104. Operation 710 can include the wireless communication device 102 performing an idle mode handoff to another channel of the first network 104. For example, the wireless communication device 102 can perform an idle mode handoff (e.g., inter-base station or intra-base station handoff) to a channel having a better signal quality (e.g., better pilot signal quality) than the first channel on which the GPM is received. Multiple idle mode handoffs can be permitted and can occur during operation 710. Operation 720 can include the wireless communication performing channel hashing to a further channel, such as in accordance with the 3GPP2 CDMA C.S0005 specification.

If AEHO is enabled for the wireless communication device 102, operation 730 can include the wireless communication device 102 performing an AEHO to a channel with a stronger pilot. However, operation 730 can be omitted in some instances, such as instances in which the first network 104 has not enabled AEHO for the wireless communication device 102.

Operation 740 can include the wireless communication device 102 entering an update overhead information sub-state of CDMA access state. In this regard, operation 740 can include the wireless communication device 102 processing one or more overhead messages received on the new channel and updating network parameters based on information included in the received overhead message(s) (e.g., after transitioning to the new channel pursuant to performance of one or more of operations 710-730).

Operation 750 can include the wireless communication device 102 sending a PRM on the new channel (e.g., pilot and frequency) that can be selected by the wireless communication device 102 after completion of operations 710-740. As such, in the example of FIG. 7, the wireless communication device 102 can transition to another channel prior to responding to the GPM and can respond to the GPM in accordance with an updated state of network parameters based on the overhead message(s) that can be processed in operation 740.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

In the foregoing detailed description, reference was made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Further, the foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. The description of and examples disclosed with respect to the embodiments presented in the foregoing description are provided solely to add context and aid in the understanding of the described embodiments. The description is not intended to be exhaustive or to limit the described embodiments to the precise forms disclosed. It will be apparent to one of ordinary skill in the art that many modifications, alternative applications, and variations are possible in view of the above teachings. In this regard, one of ordinary skill in the art will readily appreciate that the described embodiments may be practiced without some or all of these specific details. Further, in some instances, well known process steps have not been described in detail in order to avoid unnecessarily obscuring the described embodiments.

What is claimed is:

1. A method for responding to a page message, the method comprising:
    at a wireless communication device:
    receiving a page message on a first channel of a first network;
    suspending a connection to a second network in response to receiving the page message;
    transitioning to a second channel of the first network prior to responding to the page message; and
    sending a response message, responsive to the page message, to the first network on the second channel.

2. The method of claim 1, wherein suspending the connection to the second network comprises:
    at the wireless communication device:
    tuning a radio of the wireless communication device away from the first network to the second network;
    sending a message configured to trigger suspension of the connection to the second network; and
    tuning the radio back to the first network.

3. The method of claim 2, wherein the wireless communication device uses the radio to support both communication via the first network and communication via the second network.

4. The method of claim 1, wherein transitioning to the second channel comprises the wireless communication device performing an idle mode handoff.

5. The method of claim 1, wherein transitioning to the second channel comprises the wireless communication device performing channel hashing to the second channel based at least in part on a channel list message received from the first network.

6. The method of claim 1, wherein transitioning to the second channel comprises the wireless communication device indirectly transitioning from the first channel to the second channel via one or more intermediate channels of the first network.

7. The method of claim 1, wherein the first channel and the second channel are associated with a same System ID/network ID (SID/NID).

8. The method of claim 1, wherein the page message comprises a page for a mobile terminating (MT) voice call.

9. A wireless communication device comprising:
    a radio configured to support communication with a first network and with a second network; and
    processing circuitry coupled to the radio, the processing circuitry configured to control the wireless communication device to at least:
    receive a page message on a first channel of the first network;
    suspend a connection to the second network in response to receiving the page message;
    transition to a second channel of the first network prior to responding to the page message; and
    send a response message, responsive to the page message, to the first network on the second channel.

10. The wireless communication device of claim 9, wherein the processing circuitry is configured to control the wireless communication device to suspend the connection to the second network at least in part by controlling the wireless communication device to:
    tune the radio away from the first network to the second network;
    send a message configured to trigger suspension of the connection to the second network; and
    tune the radio back to the first network.

11. The wireless communication device of claim 9, wherein the processing circuitry is configured to control the wireless communication device to transition to the second channel at least in part by controlling the wireless communication device to perform an idle mode handoff.

12. The wireless communication device of claim 9, wherein the processing circuitry is configured to control the wireless communication device to transition to the second channel at least in part by controlling the wireless communication device to perform channel hashing to the second channel.

13. The wireless communication device of claim 9, wherein the processing circuitry is configured to control the wireless communication device to transition to the second channel at least in part by controlling the wireless communication device to indirectly transition from the first channel to the second channel via one or more intermediate channels of the first network.

14. The wireless communication device of claim 9, wherein the first network is a legacy network having a circuit switched (CS) domain configured to support CS services, and wherein the second network does not have a CS domain.

15. The wireless communication device of claim 14, wherein the first network is a Code Division Multiple Access 2000 (CDMA2000) 1X network, and wherein the second network implements a Long Term Evolution (LTE) radio access technology (RAT).

16. The wireless communication device of claim 15, wherein the page message is a General Page Message (GPM), and wherein the response message is a Page Response Message (PRM).

17. The wireless communication device of claim 14, wherein the page message comprises a page for a mobile terminating (MT) voice call.

18. A non-transitory computer readable storage medium storing instructions that when executed by one or more processors of a wireless communication device, cause the wireless communication device to:
    receive a page message on a first channel from a first network;
    suspend a connection to a second network in response to receiving the page message;
    transition to a second channel of the first network prior to responding to the page message; and
    send a response message, responsive to the page message received on the first channel from the first network, on the second channel to the first network.

19. The non-transitory computer-readable storage medium of claim 18, wherein the wireless communication device transitions to the second channel by at least performing an idle mode handoff.

20. The non-transitory computer-readable storage medium of claim 18, wherein the wireless communication device transitions to the second channel by at least performing channel hashing to the second channel.

* * * * *